(12) United States Patent
Dathe et al.

(10) Patent No.: US 8,266,459 B2
(45) Date of Patent: Sep. 11, 2012

(54) SUPPLYING VOLTAGE TO DIGITAL SUBCIRCUITS

(75) Inventors: Lutz Dathe, Dresden (DE); Henry Drescher, Radebeul (DE); Thomas Hanusch, Coswig (DE)

(73) Assignee: Atmel Corporation, San Jose, CA (US)

( * ) Notice: Subject to any disclaimer, the term of this patent is extended or adjusted under 35 U.S.C. 154(b) by 410 days.

(21) Appl. No.: 12/580,769

(22) Filed: Oct. 16, 2009

(65) Prior Publication Data

US 2010/0115297 A1    May 6, 2010

Related U.S. Application Data

(60) Provisional application No. 61/117,405, filed on Nov. 24, 2008.

(30) Foreign Application Priority Data

Oct. 30, 2008   (DE) .......................... 10 2008 053 900

(51) Int. Cl.
    *G06F 1/26* (2006.01)
(52) U.S. Cl. ........ 713/300; 713/330; 327/143; 327/198; 327/540
(58) Field of Classification Search .................. 713/300, 713/330; 327/143, 198, 540
    See application file for complete search history.

(56) References Cited

U.S. PATENT DOCUMENTS

| | | | | |
|---|---|---|---|---|
| 5,479,089 A * | 12/1995 | Lee | ................................ | 323/283 |
| 5,936,443 A * | 8/1999 | Yasuda et al. | ................... | 327/143 |
| 6,333,650 B1 * | 12/2001 | Amin et al. | .................... | 327/143 |
| 6,792,553 B2 * | 9/2004 | Mar et al. | ...................... | 713/330 |
| 7,098,689 B1 | 8/2006 | Tuan et al. | | |
| 7,469,353 B2 * | 12/2008 | Mundada et al. | ............. | 713/330 |
| 7,770,037 B2 * | 8/2010 | Searles et al. | ................. | 713/300 |
| 7,923,976 B2 * | 4/2011 | Al-Shyoukh et al. | ......... | 323/270 |
| 8,030,910 B2 * | 10/2011 | Lima et al. | .................... | 323/282 |
| 2002/0165622 A1 * | 11/2002 | Fujii | ............................... | 700/22 |
| 2003/0179524 A1 | 9/2003 | Chou | | |
| 2004/0263237 A1 | 12/2004 | Kim et al. | | |
| 2005/0068059 A1 | 3/2005 | Takahashi et al. | | |
| 2010/0115297 A1 | 5/2010 | Dathe | | |

FOREIGN PATENT DOCUMENTS

WO    WO 02/11242 A2    2/2002
WO    WO 2005/043362 A2    5/2005

OTHER PUBLICATIONS

Office Action and English Translation for Chinese Patent Application 200910167041.9, Jan. 4, 2012.

* cited by examiner

*Primary Examiner* — Nitin Patel
(74) *Attorney, Agent, or Firm* — Baker Botts L.L.P.

(57) ABSTRACT

Circuit, method for operating a circuit, and use, having a voltage regulator, which has a regulator output for providing a supply voltage, which for the supply can be connected to at least one first digital subcircuit via a first switch and to a second digital subcircuit via a second switch, wherein the voltage regulator is formed to output a first status signal dependent on the supply voltage, and to turn on the first switch by the first status signal is connected to a first control input of the first switch, and the first switch is formed to output a second status signal dependent on its switching state, and to turn on the second switch by the second status signal is connected to a second control input of the second switch.

18 Claims, 3 Drawing Sheets

SUPPLYING VOLTAGE TO DIGITAL SUBCIRCUITS

This nonprovisional application claims priority to German Patent Application No. 10 2008 053 900.7, which was filed in Germany on Oct. 30, 2008, and to U.S. Provisional Application No. 61/117,405, which was filed on Nov. 24, 2008, and which are both herein incorporated by reference.

BACKGROUND OF THE INVENTION

1. Field of the Invention

The present invention relates to a circuit having a voltage regulator for providing a supply voltage for at least one first digital subcircuit and a second digital subcircuit, as well as a method for operating a circuit, and a use of a voltage regulator of a first switch and a second switch of a circuit.

2. Description of the Background Art

A circuit of a radio system, particularly according to the industry standard ZigBee, can be supplied by a battery. ZigBee is provided for use of maintenance-free radio switches and radio sensors with a battery supply in poorly or rarely accessible areas. A voltage regulator may be used to generate the necessary supply voltage for digital subcircuits, such as, for example, a memory or signal processing, from the battery voltage of the battery.

U.S. Pat. Application No. 2004/0263237 A1 discloses a semiconductor integrated circuit having a transistor with a non-abrupt switching response for a sleep mode (sleep). A switching mechanism reduces the amplitude of voltage variations in the supply voltage lines and reduces the time interval for stabilizing the supply voltage.

U.S. Publication No. 2005/0068059 A1 discloses a semiconductor integrated circuit with a switching device between a logic circuit and a voltage supply. To output a supply voltage, a voltage regulator is connected to a logic circuit via a PMOS transistor. The voltage regulator is connected to a control circuit to control the voltage regulator, whereby to output a control signal the control circuit is connected to a gate of the PMOS transistor.

A circuit with a voltage supply is disclosed in U.S. Pat. No. 7,098,689 B1, which is connected to a first programmable logic block via a first PMOS transistor and to a second programmable logic block via a second PMOS transistor.

SUMMARY OF THE INVENTION

It is therefore an object of the present invention to provide a circuit that can have a voltage regulator with a regulator output for providing a supply voltage. The controller output for the supply can be connected to at least one first digital subcircuit and a second subcircuit. The connection of the controller output to the first digital subcircuit can be made via a first switch and the connection of the controller output to the second digital subcircuit can be made via a second switch. For switching, the switch can be a semiconductor switch, such as for example, a field-effect transistor.

The voltage regulator can be configured to output a first status signal, dependent on the supply voltage, at a voltage regulator signal output. The status signal can be a digital signal, whereby a value is assigned to a status for voltage regulator operational readiness. A value of the first status signal can depend on an exceeding of a threshold voltage by the supply voltage and/or on an amplitude of the control deviation. To turn on the first switch by the first status signal, the signal output of the voltage regulator can be connected to a first control input of the first switch.

The first switch can be configured to output a second status signal, dependent on its switching state, at a signal output of the first switch. The first switch can be formed to determine the switching state from a switching current or a voltage drop across the first switch. The circuit can be formed to turn on the second switch by the second status signal. For this purpose, the signal output of the first switch can be connected to a second control input of the second switch.

The first subcircuit can act as a predominantly capacitive load, so that the first switch switches in a low power manner predominantly a charging current for the predominantly capacitive load of the first subcircuit. The second subcircuit can act as a predominantly capacitive load, so that the second switch switches in a low power manner predominantly a charging current for the predominantly capacitive load of the second subcircuit. The first subcircuit and/or the second subcircuit can be formed for storing digital information; here, the first subcircuit and/or the second subcircuit can be formed or connected not to lose the digital information also during disconnection from the voltage regulator. For example, the first subcircuit and/or the second subcircuit are formed as a CMOS circuit.

The switching preferably occurs asynchronously by the first switch and/or the switch and thereby independent of a system clock. The voltage regulator preferably forms the first switch and the second switch of a control chain. The control chain in this case does not form a closed control loop.

The circuit can be integrated monolithically on a semiconductor chip. Preferably, the circuit has various modes, the current consumption being reduced in a sleep mode, compared with an operating mode, by reduction of circuit functionality. The current consumption can be minimized in a deep sleep mode by disconnecting parts of the circuit from the battery voltage by a semiconductor switch.

A further object of the invention is to provide for a method of operating a circuit with a voltage regulator, a first digital subcircuit, and a second digital subcircuit.

In the method, the voltage regulator is turned on first. The turning on occurs as a function of a request signal. The request signal can be, for example, a wake up signal for waking up from a sleep mode or a reset signal (reset).

The voltage regulator outputs a first status signal as a function of supply voltage provision. The first status signal in this case is generated, for example, by a comparison of the supply voltage with a threshold value. The status signal is, for example, an edge change of a digital signal.

Depending on the first status signal, the supply voltage can be switched to the first digital subcircuit by a first switch. The first status signal in this case causes a turning on of the first switch, so that the supply voltage is applied at the first digital subcircuit after a switching phase of the first switch. The first switch outputs a second status signal depending on a switching state. The switching state is advantageously determined by a switching current or switching voltage.

Depending on the second status signal, the supply voltage is switched to the second digital subcircuit by means of a second switch. The second status signal in this case causes a turning on of the second switch, so that the supply voltage is applied at the second digital subcircuit after a switching phase of the second switch.

The invention furthermore has as its object to provide a use. Accordingly, a use of a voltage regulator, a first switch, and a second switch of a circuit as an element in an electrical control chain is provided. In a control chain, each element controls the next member in the chain. This enables an interdependent control of the voltage regulator, the first switch, and the second switch.

The voltage regulator as an element in the control chain can be formed to output a first status signal for controlling a switching of the first switch. The first switch as a subsequent element in the control chain can be formed to output a second status signal for controlling a switching of the second switch. The second switch as the next element in the control chain can be formed to output a third status signal.

The circuit is formed to start an interrupt routine as a function of the third status signal. In this case, the third status signal can cause the starting of the interrupt routine directly or indirectly via other elements of the control chain. The interrupt routine can be implemented, for example, in a program run in an arithmetic logic unit, such as a microcontroller.

The refinements described hereinafter relate to the circuit, as well as to the use and to the method for operating a circuit. Functional features of the circuit in this case emerge from the methods features. Methods features can be derived from the functions of the circuit.

According to an embodiment, the voltage regulator can have a control input for turning on the voltage regulator. The control input can be connected to a control circuit for controlling the voltage regulator by means of the control circuit. The control circuit can be formed to output a control signal at its control output as a function of a request signal. To turn on the voltage regulator, the control signal reaches the control input of the voltage regulator. The request signal can be a reset signal (reset) or formed from a reset signal.

In an embodiment, for turning off, the control circuit can be connected directly to control inputs of the voltage regulator and/or of the first switch and/or of the second switch. The control circuit can be formed for the substantially simultaneous turning off of the voltage regulator and disconnecting the connection between the voltage regulator and subcircuit by the first switch and/or the second switch.

According to another embodiment, it is provided that the control circuit can be formed to control a number of clock gates for the first subcircuit and/or the second subcircuit. Alternatively, an arithmetic logic unit can be formed to control the clock gate for the first subcircuit and/or the second subcircuit. The control circuit and/or arithmetic logic unit are thereby formed to control the clock gates as a function of the switching states of the first switch and of the second switch.

According to an embodiment, the circuit can have a third analog and/or digital subcircuit. It is possible to connect the third subcircuit via a third switch to the regulator output for supplying with the supply voltage. The second switch is formed to output a third status signal, dependent on its switching state, at a second status signal output of the second switch. The second status signal output for turning on the third switch by means of the third status signal is connected to a third control input of the third switch.

According to an embodiment, an input of the control circuit can be connected downstream of a signal output of the second switch to output a third status signal, dependent on the switching state of the second switch, in a control chain. The input of the control circuit can be connected to the signal output of the second switch or to a signal output of a third switch or subsequent switch.

The control circuit can be formed to output an end status signal at an output connected to an arithmetic logic unit. The arithmetic logic unit can be formed to extend a reset signal up to the end status signal. The arithmetic logic unit can be formed to activate a clock as a function of the end status signal. For example, the end status signal is a release signal to release the program run of the arithmetic logic unit. Alternatively, the end status signal may influence the reset signal, for example, extend it.

In yet a further embodiment, the control circuit and/or the arithmetic logic unit can be formed to extend a reset signal as a function of the end status signal. The circuit can have a memory element, such as, for example, a flip-flop for storing the reset signal, the storage advantageously being cleared by the end status signal.

In an embodiment, it is provided that one of the subcircuits can have a number of volatile memory units (SRAM). In a further embodiment, it is provided that one of the subcircuits has a digital signal processor. In yet a further embodiment, it is provided that one of the subcircuits has a number of nonvolatile memory units (flash).

According to an embodiment, it is provided that the request signal can be derived from a reset signal or corresponds to the reset signal. It is provided in another embodiment that the reset signal can extend at least until a switching state of the second switch is reached. Further, a clock signal for the first subcircuit and/or the second subcircuit can be turned on only after a switching state of the second switch is reached to connect the output of the voltage regulator to the subcircuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
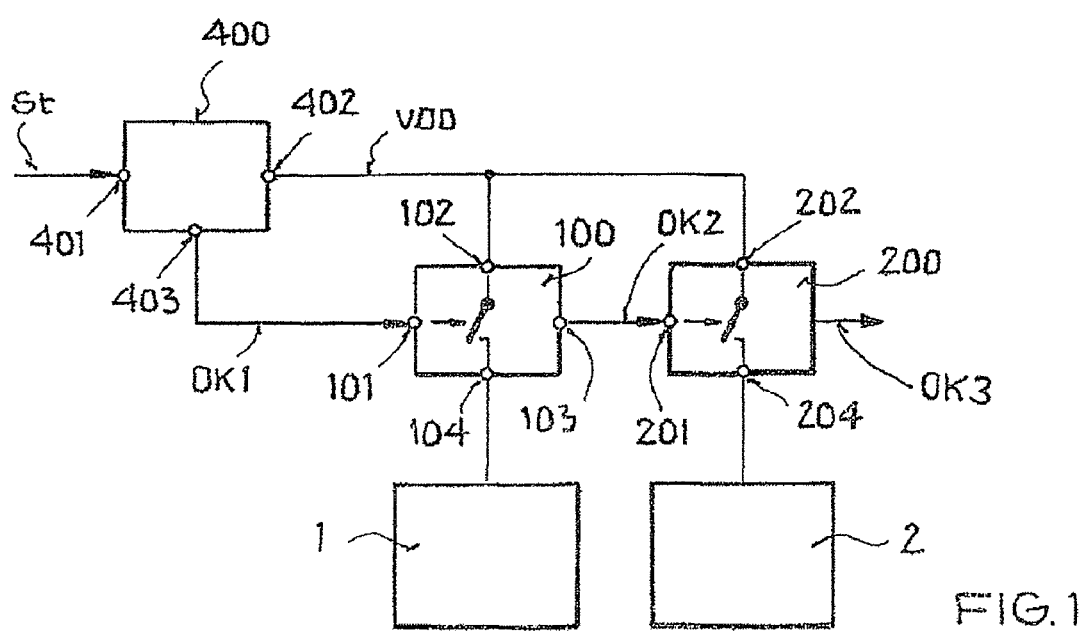
FIG. 1 shows a schematic block diagram of a first embodiment of a circuit.

A circuit is shown schematically by a block diagram in FIG. 1. A voltage regulator 400 has a regulator output 402 for providing a supply voltage VDD for a first digital subcircuit 1 and a second digital subcircuit 2. In order to connect regulator output 402 to or to disconnect it from first subcircuit 1 or second subcircuit 2, a first switch 100 and a second switch 200 are provided whose inputs 102 and 202 are connected for this purpose to regulator output 402.

Voltage regulator 400 has a control input 401, whereby voltage regulator 400 can be turned on by means of the control signal St. Voltage regulator 400 moreover has a signal output 403 to output a first status signal OK1. The first status signal OK1 in this case is dependent on the provided supply voltage VDD.

Signal output 403 of voltage regulator 400 in the exemplary embodiment of FIG. 1 is connected to a first control input 101 of first switch 100. First switch 100 has a first status signal output 103. First switch 100 is connected via its output 104 to first subcircuit 1 to switch the supply voltage VDD to first subcircuit 1.

First switch 100 is formed to output a second status signal OK2, dependent on its switching state, at signal output 103. To turn on second switch 200 by means of the second status signal OK2, first switch 100 is connected to second control input 201 of second switch 200. Second switch 200 is formed to output a third status signal OK3, dependent on its switching state, at signal output 203. The third status signal OK3 can be used to control, for example, additional switch or to initiate a program routine.

Second switch 200 is connected via its output 204 to second subcircuit 2 to switch the supply voltage VDD to second subcircuit 2. The switching of second switch 200 in so doing is controlled by the second status signal OK2 at control input 201.

Figure 2:
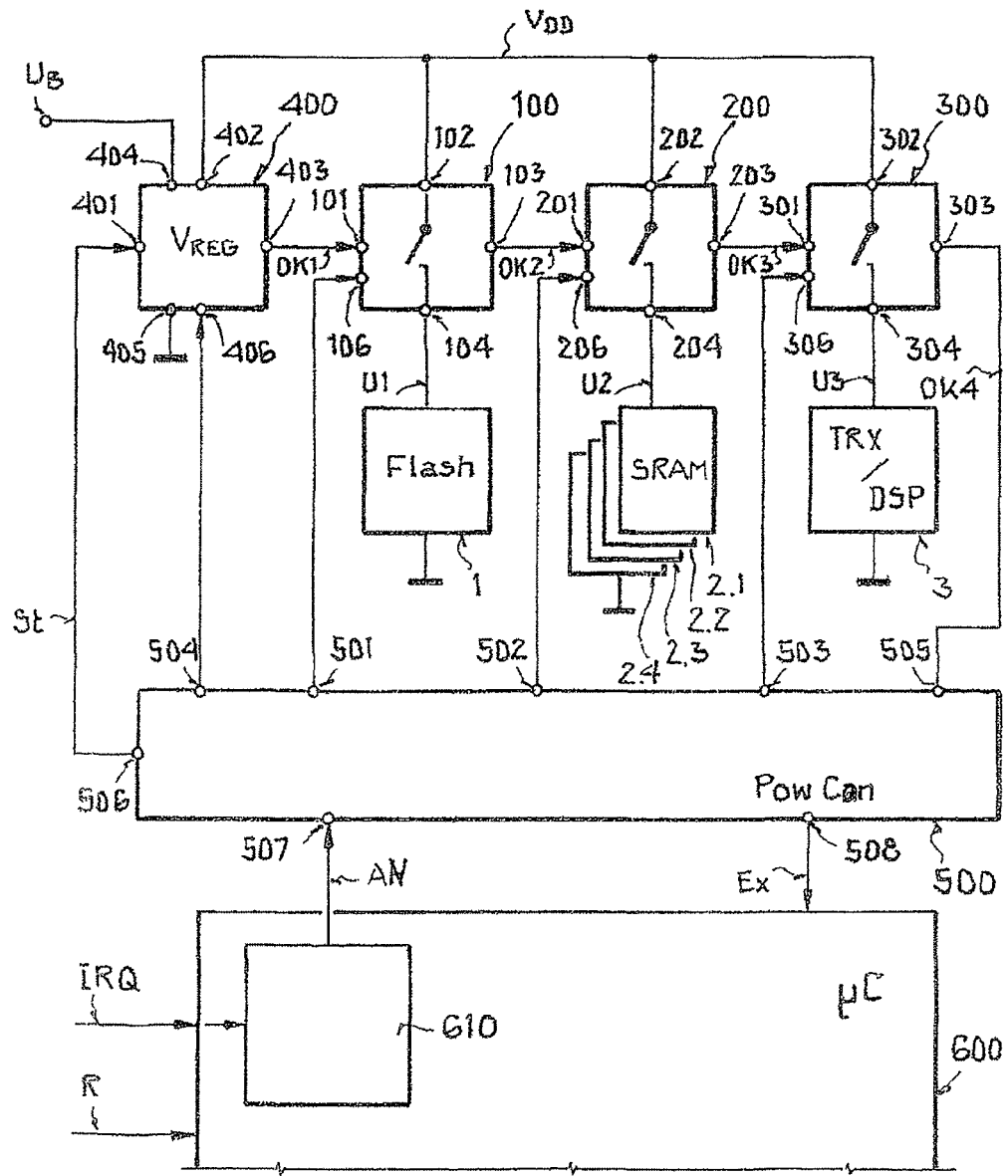
FIG. 2 shows a schematic block diagram of a second embodiment of a circuit.

Another exemplary embodiment of a circuit is shown schematically as a block diagram in FIG. 2. A voltage regulator 400 (VREG) has control inputs 401 and 406 and a signal output 403 to output a first status signal OK1. At regulator output 402, voltage regulator 400 provides the supply voltage VDD, which is generated by voltage regulator 400 from the battery voltage $U_B$. To this end, voltage regulator 400 is connected with terminal 404 to battery voltage $U_B$ and with terminal 405 to ground.

The circuit of the exemplary embodiment of FIG. 2 has a first switch 100, a second switch 200, and a third switch 300. Switch 100, 200, 300 are preferably circuits that have a switching element in the form of a switching transistor, for example, a MOSFET or DMOS. Each switch 100, 200, 300 has control inputs 101, 106, 201, 206, 301, 306, inputs 102, 202, 302 connected to regulator output 402, signal outputs 103, 203, 303, and outputs 104, 204, and 304 connected to subcircuits 1, 2, 3. In this case, the voltages U1, U2, and U3 drop across subcircuits 1, 2, and 3, respectively. Each switch 100, 200, 300 is formed to output a status signal OK2, OK3, and OK4, respectively, dependent on its switching state.

Furthermore, the circuit of the exemplary embodiment of FIG. 2 has a control circuit 500, which is connected to an arithmetic logic unit 600, for example, a microcontroller (μC), via an input 507 and an output 508. Arithmetic logic unit 600 has inputs or circuit regions for signals, for example, a reset signal R or an interrupt signal IRQ. For this purpose, arithmetic logic unit 600 may have, for example, a sleep/wake control circuit 610 (sleep controller).

In the off state of voltage regulator 400, arithmetic logic unit 600 may send a request signal AN to input 507 of control circuit 500. The request signal AN here represents the request for access to one or more of subcircuits 1, 2, 3. In response to the request signal AN, control circuit 500 by means of the control signal St controls voltage regulator 400 and turns it on. The voltage regulator generates a first status signal OK1 with an adjusted supply voltage VDD. As the next element in a control chain, first switch 100 is controlled by the first status signal OK1 and connects regulator output 402 to a flash memory (flash) as first digital subcircuit 1.

First switch 100 as a function of the switching state generates a second status signal OK2, which controls second switch 200 and thus connects regulator output 402 to static memory blocks (SRAM) as second subcircuit 2. Instead of a single output 204 of second switch 200, shown in the exemplary embodiment of FIG. 2, four outputs (not shown) may be provided for connection to a memory block 2.1, 2.2, 2.3, 2.4 in each case, whereby the second switch in this exemplary embodiment (not shown) connects the individual memory blocks 2.1, 2.2, 2.3, 2.4 one after another to regulator output 402.

In the exemplary embodiment of FIG. 2, second switch 200, as a function of the switching state, generates a third status signal OK3 that controls a third switch 300, so that third switch 300 connects regulator output 402 to an analog/digital transceiver (TRX) and a digital signal processor (DSP) as third subcircuit 3. Third switch 300 generates a switching state-dependent fourth status signal OK4, which reaches an input 505 of control circuit 500 (PowCon). Control circuit 500 thereupon generates a confirmation signal Ex, which is transmitted via output 508 back to arithmetic logic unit 600, whereby arithmetic logic unit 600 depending on the confirmation signal Ex starts a program routine with later accesses to at least one of subcircuits 1, 2, 3.

Control circuit 500 is formed to control a turning off of voltage regulator 400 and to control disconnection by switch 100, 200, and 300 via outputs 501, 502, 503, and 504 and control inputs 106, 206, 306, and 406, to place the circuit in a sleep mode with a reduced current consumption.

Several advantages are achieved by the exemplary embodiment of FIG. 2. Unreliable overlappings of signal edges are avoided by arranging voltage regulator 400, first switch 100, second switch 200, and third switch 300 in a control chain. Such overlappings could lead to a malfunction of subcircuits 1, 2, 3 and lead to a deletion of stored information, for example, in the event of a voltage dip. Time signal uncertainties (race condition) are therefore advantageously avoided by the exemplary embodiment of FIG. 2. Start-up current peaks, which could arise, for example, due to a purely time control of switch 100, 200, 300 and therefore during a possible time overlapping of currents, are eliminated by means of the control chain of the exemplary embodiment of FIG. 2. Due to the asynchronous control of the switch, no clock is needed, which therefore need not be available during the turning on and advantageously is switched on only later by clock gates (gates). For example, the clock signal (clock) is switched depending on the confirmation signal Ex.

Figure 3:
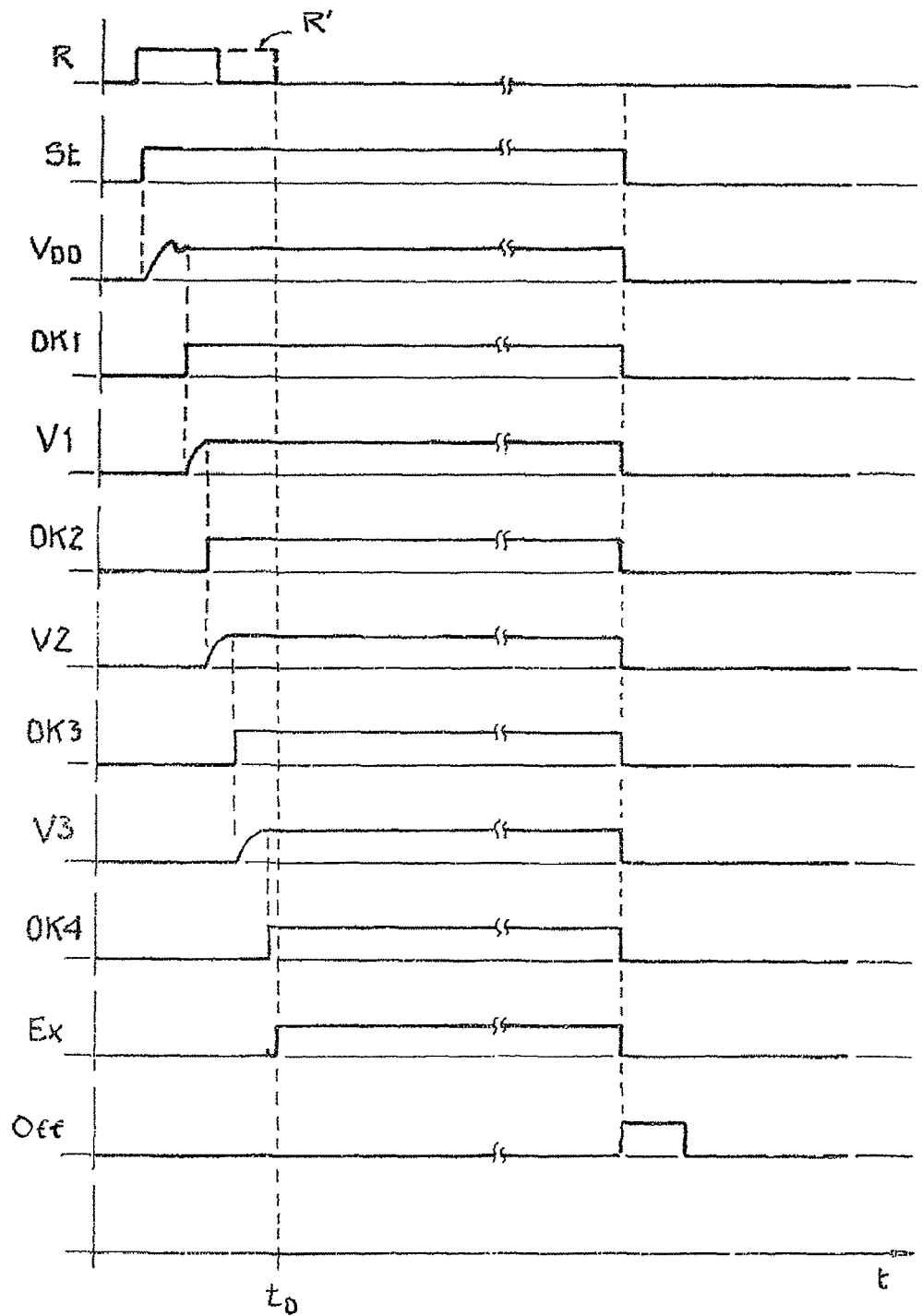
FIG. 3 shows a schematic diagram.

A diagram is shown schematically in FIG. 3, with whose help the process steps of a method for operating a circuit according to the exemplary embodiment of FIG. 1 or the exemplary embodiment of FIG. 2 can be explained.

In FIG. 3, a reset signal R is shown as the request signal. Depending on the request signal R, the voltage regulator is turned on by the control signal St. With the turning on of the voltage regulator, the supply voltage VDD provided at its output increases.

If an actual value of the supply voltage VDD corresponds sufficiently to a target value of the supply voltage, the voltage regulator outputs a first status signal OK1 depending on the correspondence.

Depending on the first status signal OK1, a first switch switches the supply voltage VDD, supplied at the regulator output of the voltage regulator, to the first digital subcircuit. In this case, the voltage U1 across the first digital subcircuit increases to the value of the supply voltage VDD. Depending on a switching state, which is defined, for example, by a comparison of the applied voltage U1 with the supply voltage, the second switch outputs a second status signal OK2.

Depending on the second status signal OK2, a second switch switches the supply voltage VDD, supplied at the regulator output of the voltage regulator, to the second digital subcircuit. In this case, the voltage U2 across the second digital subcircuit increases to the value of the supply voltage VDD. Depending on a switching state, which is defined, for example, by a comparison of the applied voltage U2 with the supply voltage, the second switch outputs a third status signal OK3.

Depending on the third status signal OK3, a third switch switches the supply voltage VDD supplied at the regulator output of the voltage regulator to a third analog and/or digital subcircuit. In this case, the voltage U3 across the third digital subcircuit increases to the value of the supply voltage VDD. Depending on a switching state, which is defined, for example, by a comparison of the applied voltage U3 with the supply voltage, the third switch outputs a fourth status signal OK4.

In the exemplary embodiment of FIG. 3, the fourth status signal OK4 depends on the third status signal OK3 via the function of the third switch. The third status signal OK3 depends on the second status signal OK2 via the function of the second switch. The second status signal OK2 depends on the first status signal OK1 via the function of the first switch. A signal Ex, which is assigned a status of complete processing of a control chain comprising the voltage regulator and the switch, is generated depending on the fourth status signal OK4.

The reset signal R is extended up to signal Ex, in that the reset signal R is stored until time point t0 and reset again by the signal Ex. The course of the stored reset signal R' is also shown.

A turning off of the voltage regulator and disconnection of the regulator output of the voltage regulator from the subcircuits by means of the switch are also possible. To this end, the signal OFF is generated, which causes a simultaneous disconnection of the switch. In addition, the voltage regulator is turned off at the same time. Depending on the resistances in the circuits, the discharge curves may also be flatter than shown.

The invention is not limited to the shown embodiment variants in FIGS. 1 through 3. For example, it is possible to provide a greater number of switch for a greater number of analog and/or digital subcircuits in the control chain. It is also advantageous to provide SRAM 2.1, 2.2, 2.3, 2.4 at the start in the control chain, so that the SRAM is turned on immediately after the voltage regulator (not shown in FIG. 2). Alternatively, it is also possible to provide the SRAM at the end in the control chain, so that the SRAM is supplied with the output voltage of the voltage regulator after all other subcircuits (not shown in FIG. 2). The functionality of the circuit according to FIG. 2 can be used especially advantageously for a universal radio system, in particular according to the industry standard IEEE 802.15.4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit comprising:
a voltage regulator configured to generate a supply voltage and a supply voltage status signal indicating a status of the supply voltage;
a plurality of subcircuits;
a chain of switches comprising a first switch and one or more second switches, each switch in the chain of switches being configured to generate a switch state status signal indicating a respective switch state, the first switch being configured to connect the supply voltage to a respective one of the plurality of subcircuits based on the supply voltage status signal, and each one of the second switches being configured to connect the supply voltage and a respective one of the plurality of subcircuits based on a switch state status signal received from a previous switch in the chain of switches.

2. The circuit of claim 1, further comprising a controller configured to transmit an enable signal to the voltage regulator, causing the voltage regulator to generate the supply voltage based on the enable signal.

3. The circuit of claim 2, wherein the controller is further configured to transmit a disconnect signal to at least one switch in the chain of switches, causing the at least one switch in the chain of switches to disconnect the supply voltage from a respective subcircuit based on the disconnect signal.

4. The circuit of claim 2, wherein the controller is further configured to transmit a clock enable signal to at least one of the plurality of subcircuits, causing the at least one of the plurality of subcircuits to enable its one or more clocks based on the clock enable signal.

5. The circuit of claim 4, wherein the controller is configured to transmit the clock enable signal based on the switch state status signal generated by a last switch in the chain of switches.

6. The circuit of claim 1, wherein one or more of the plurality of subcircuits comprises one or more of the following:
a flash memory;
a static memory block;
an analog/digital transceiver; and
a digital signal processor.

7. A method comprising:
generating, by a voltage regulator, a supply voltage and a supply voltage status signal indicating a status of the supply voltage;
generating, by each switch in a chain of switches comprising a first switch and one or more second switches, a switch state status signal indicating a respective switch state;
connecting, by the first switch, the supply voltage to a respective one of a plurality of subcircuits based on the supply voltage status signal; and
connecting, by each one of the second switches, the supply voltage and a respective one of the plurality of subcircuits based on a switch state status signal received from a previous switch in the chain of switches.

8. The method of claim 7, further comprising transmitting, by a controller, an enable signal to the voltage regulator, causing the voltage regulator to generate the supply voltage based on the enable signal.

9. The method of claim 8, further comprising transmitting, by the controller, a disconnect signal to at least one switch in the chain of switches, causing the at least one switch in the chain of switches to disconnect the supply voltage from a respective subcircuit based on the disconnect signal.

10. The method of claim 8, further comprising transmitting, by the controller, a clock enable signal to at least one of the plurality of subcircuits, causing the at least one of the plurality of subcircuits to enable its one or more clocks based on the clock enable signal.

11. The method of claim 10, wherein the transmitting, by the controller, the clock enable signal is based on the switch state status signal generated by a last switch in the chain of switches.

12. The method of claim 7, wherein one or more of the plurality of subcircuits comprises one or more of the following:
a flash memory;
a static memory block;
an analog/digital transceiver; and
a digital signal processor.

13. A system comprising:
means for generating a supply voltage and a supply voltage status signal indicating a status of the supply voltage;

means for generating a switch state status signal indicating a respective switch state of a respective switch in a chain of switches comprising a first switch and one or more second switches;

means for connecting the supply voltage to a respective one of a plurality of subcircuits based on the supply voltage status signal; and means for connecting the supply voltage and a respective one of the plurality of subcircuits based on a switch state status signal received from a previous switch in the chain of switches.

14. The system of claim 13, further comprising means for transmitting an enable signal to the means for generating the supply voltage, causing the means for generating the supply voltage to generate the supply voltage based on the enable signal.

15. The system of claim 14, further comprising means for transmitting a disconnect signal to at least one switch in the chain of switches, causing the at least one switch in the chain of switches to disconnect the supply voltage from a respective subcircuit based on the disconnect signal.

16. The system of claim 14, further comprising means for transmitting a clock enable signal to at least one of the plurality of subcircuits, causing the at least one of the plurality of subcircuits to enable its one or more clocks based on the clock enable signal.

17. The system of claim 16, wherein the transmitting the clock enable signal is based on the switch state status signal generated by a last switch in the chain of switches.

18. The system of claim 13, wherein one or more of the plurality of subcircuits comprises one or more of the following:

a flash memory;
a static memory block;
an analog/digital transceiver; and
a digital signal processor.

* * * * *